United States Patent
Shinbo

(10) Patent No.: US 7,538,943 B2
(45) Date of Patent: May 26, 2009

(54) SCREEN AND IMAGE DISPLAY APPARATUS

(75) Inventor: Akira Shinbo, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 434 days.

(21) Appl. No.: 11/340,747

(22) Filed: Jan. 27, 2006

(65) Prior Publication Data
US 2006/0171027 A1  Aug. 3, 2006

(30) Foreign Application Priority Data

Feb. 2, 2005 (JP) ............... 2005-025992
Sep. 28, 2005 (JP) ............... 2005-281509

(51) Int. Cl.
G03B 21/60 (2006.01)
(52) U.S. Cl. .................. 359/459; 359/460
(58) Field of Classification Search ............... 359/457, 359/460, 742–743, 459
See application file for complete search history.

(56) References Cited

U.S. PATENT DOCUMENTS

| | | | | |
|---|---|---|---|---|
| 4,636,035 A | * | 1/1987 | Clausen et al. | 359/457 |
| 4,708,435 A | * | 11/1987 | Yata et al. | 359/456 |
| 7,230,758 B2 | * | 6/2007 | Huang | 359/457 |
| 7,362,503 B2 | * | 4/2008 | Yoshikawa et al. | 359/457 |

| | | | |
|---|---|---|---|
| 2004/0196562 A1 | 10/2004 | Watanabe et al. | |
| 2006/0007536 A1 | 1/2006 | Huang | |

FOREIGN PATENT DOCUMENTS

| | | |
|---|---|---|
| JP | A-59-139026 | 8/1984 |
| JP | A 61-254941 | 11/1986 |
| JP | A-61-277935 | 12/1986 |
| JP | A-62-249134 | 10/1987 |
| JP | A 05-281402 | 10/1993 |
| JP | A-2000-180967 | 6/2000 |
| JP | A 2003-149744 | 5/2003 |
| JP | A 2004-529394 | 9/2004 |
| KR | 1997-0068567 | 10/1997 |
| KR | 1998-075852 | 1/1998 |

* cited by examiner

Primary Examiner—Christopher E Mahoney
(74) Attorney, Agent, or Firm—Oliff & Berridge PLC

(57) ABSTRACT

A screen that transmits light according to an image signal includes: a first surface and a second surface provided at an incident side of the light according to the image signal; a light exiting surface that outputs the light according to the image signal; and an angle conversion part that performs angle conversion on the light according to the image signal and outputs the light, wherein the second surface reflects the light incident from the first surface toward the light exiting surface, and wherein at least one of the first surface and the second surface has one of a light divergence function of diverging the incident light and a light convergence function of converging the incident light.

11 Claims, 12 Drawing Sheets

F I G. 1
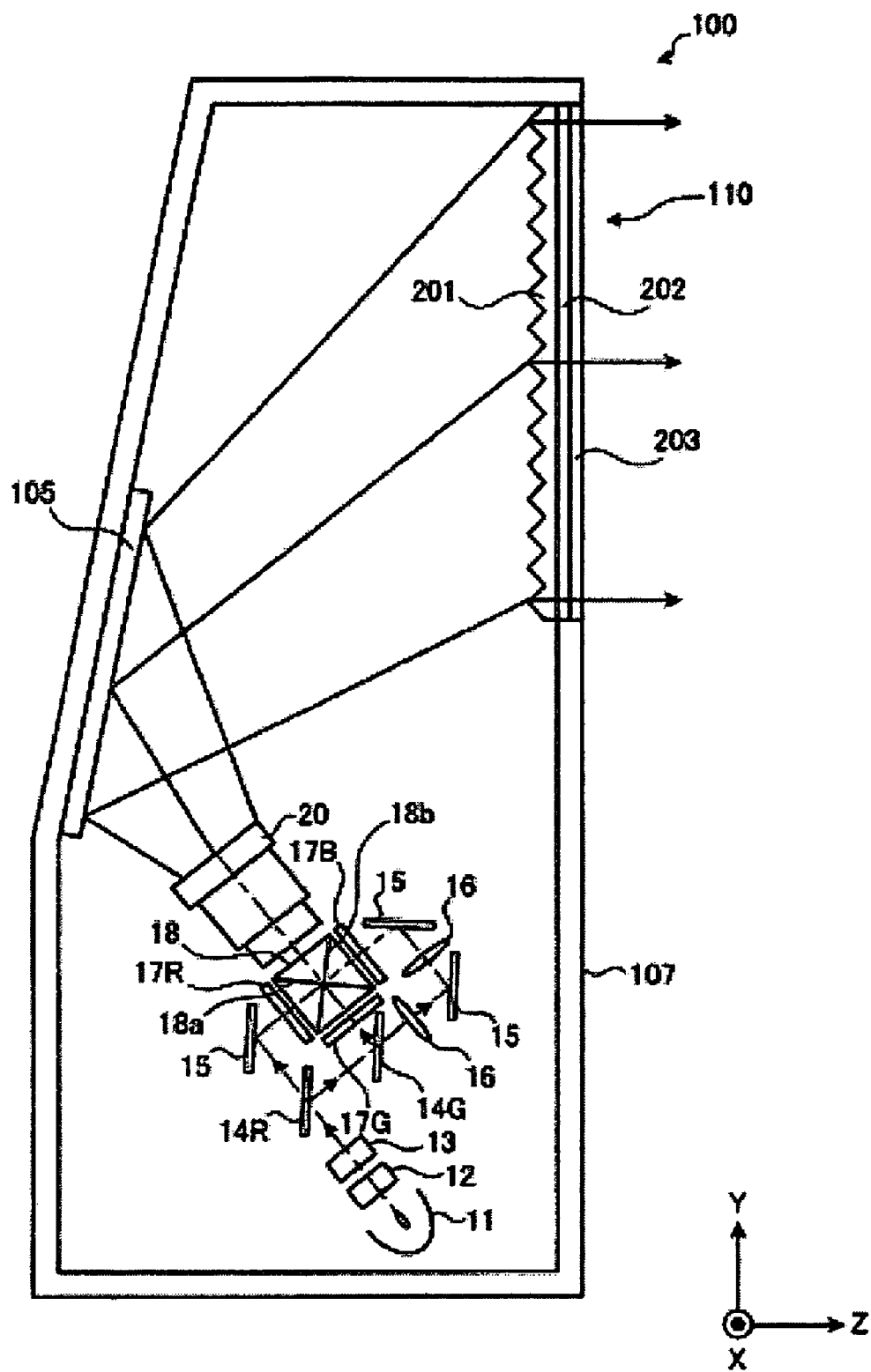

F I G. 2
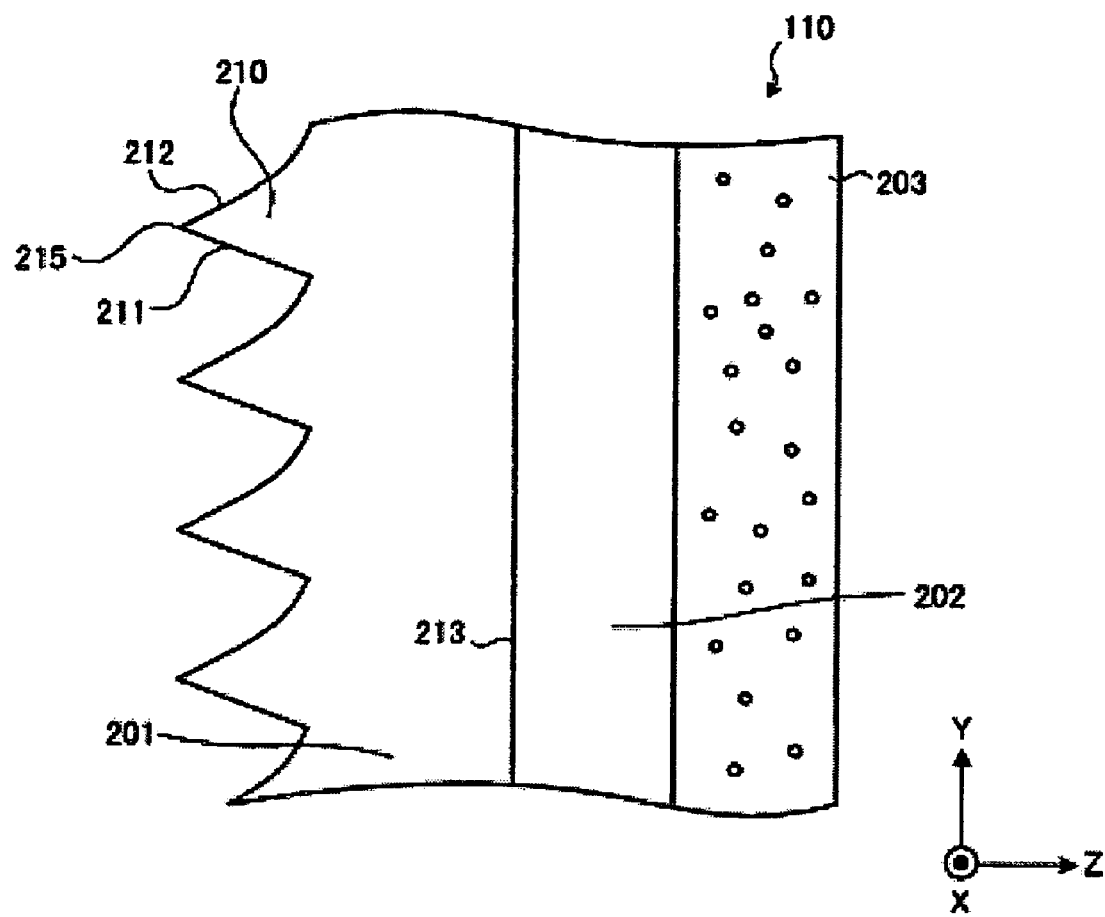
F I G. 3
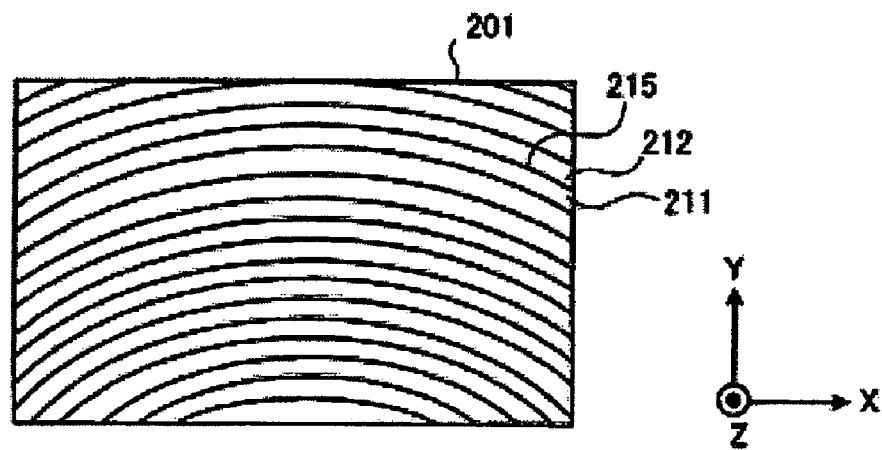

F I G. 4
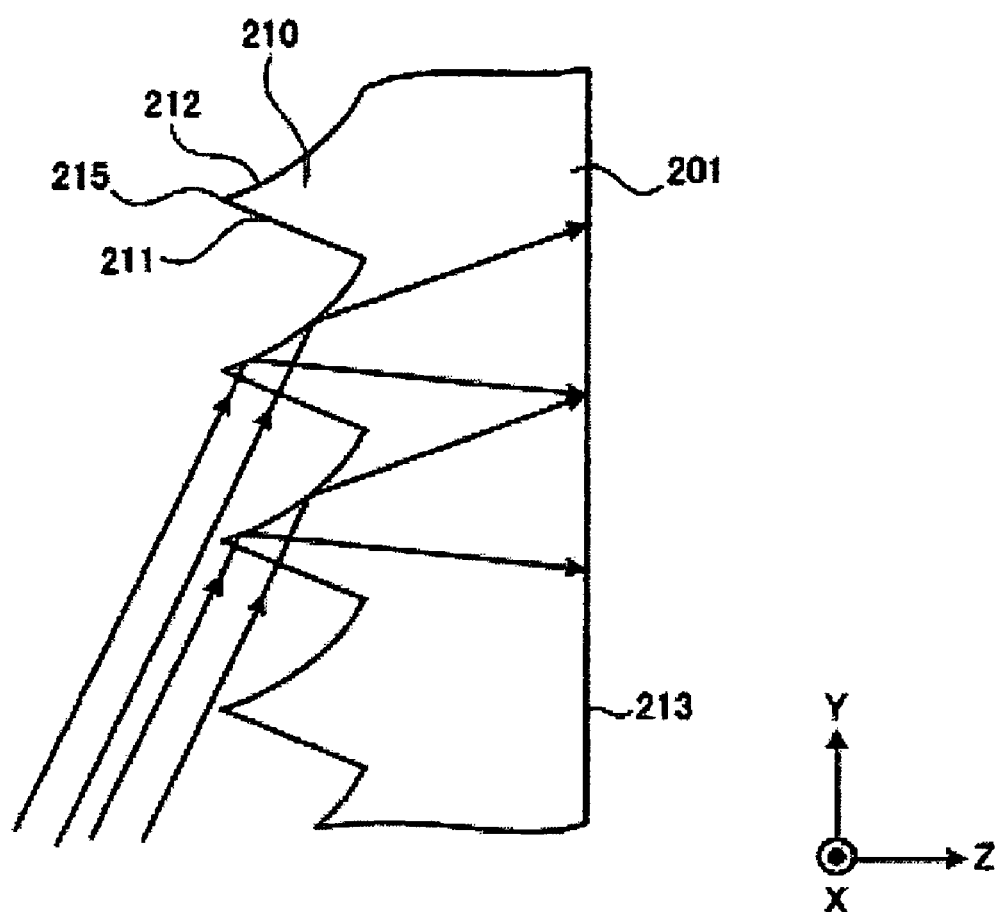

F I G. 7
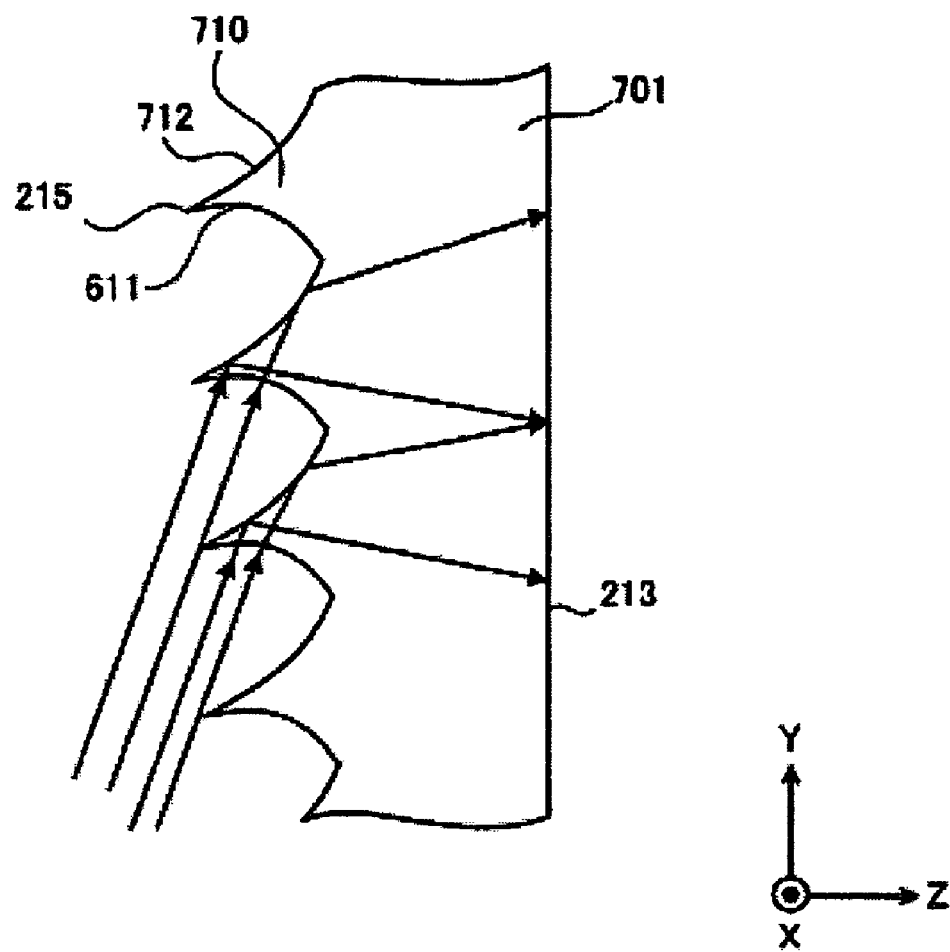

F I G. 1 1
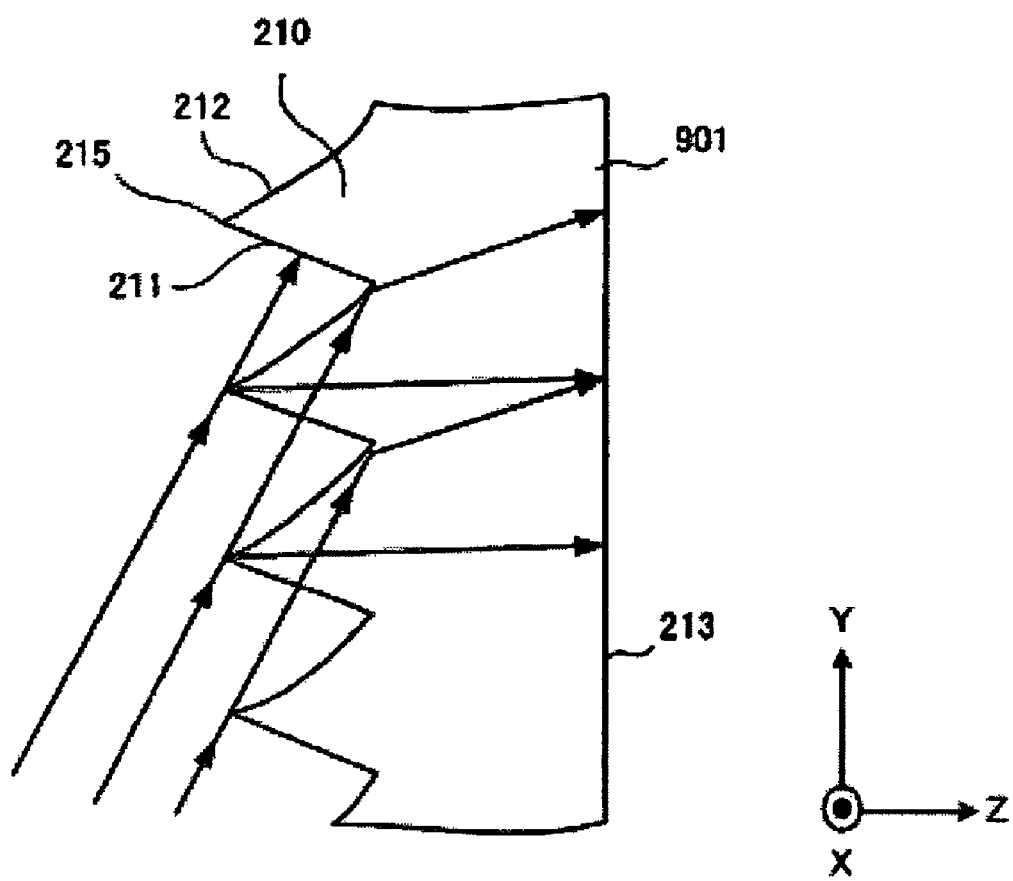

SCREEN AND IMAGE DISPLAY APPARATUS

CROSS REFERENCE TO RELATED APPLICATIONS

The present application claims priority to Japanese Patent Application No. 2005-025992 filed on Feb. 2, 2005 in Japan, and to Japanese Patent Application No. 2005-281509 filed on Sep. 28, 2005 in Japan, which are hereby incorporated by reference herein in their entirety.

BACKGROUND

The present invention relates to a screen and an image display apparatus, and specifically, to a screen technology suitable for an image display apparatus for displaying an image by transmitting light according to an image signal.

For a so-called rear projector that displays an image by transmitting light according to an image signal, a transmissive screen that transmits light is used. The rear projector has been made thinner by adopting a configuration that light according to an image signal is entered from a diagonal direction relative to the screen. In the case where the light is entered from the diagonal direction relative to the screen, it is necessary for the screen to have a configuration that the diagonally entered light is angle-converted into a direction toward an observer. Further, it is considered that the larger the incident angle of light entering the screen, the easier total reflection of the light occurs at the boundary of the screen. When the light is taken into the projector due to total reflection on the screen, it becomes difficult to display bright images. Furthermore, when the light is taken into the projector, sometimes ghost images are produced due to multipath reflection of stray lights. Accordingly, in order to obtain bright high-quality images, the screen must have a configuration that the diagonally entered light is efficiently advanced toward the observer. A screen technology for efficiently advancing the diagonally entered light has been proposed in JP-A-2003-149744, for example.

A Fresnel lens enters light from a slope at the lower side as a side where a light valve is provided as seen from a screen, and totally reflects the incident light on a slope at the upper side. However, in the technology proposed in JP-A-2003-149744, brightness variations are greatly produced in the light exiting from the Fresnel lens. Accordingly, there is a problem that it is difficult to eliminate the brightness variations of light from the screen even when the light is uniformized by providing a diffusion layer or the like at the light exiting side of the Fresnel lens. An advantage of some aspects of the invention is to provide a screen by which incident light can be efficiently advanced in a predetermined light exiting direction and brightness variations can be reduced, and an image display apparatus.

SUMMARY

According to the invention, a screen that transmits light according to an image signal including: a first surface and a second surface provided at an incident side of the light according to the image signal; a light exiting surface that outputs the light according to the image signal; and an angle conversion part that performs angle conversion on the light according to the image signal and outputs the light, wherein the second surface reflects the light incident from the first surface toward the light exiting surface, and wherein at least one of the first surface and the second surface has one of a light divergence function of diverging the incident light and a light convergence function of converging the incident light can be provided.

The light that has traveled diagonally relative to the screen enters the first surface of the angle conversion part. The light incident from the first surface to the angle conversion part is reflected from the second surface toward the light exiting surface. The light traveling toward the light exiting surface exits from the screen, and then, travels toward an observer. Thus, the light that has diagonally entered the screen can be efficiently advanced toward the observer. The light according to the image signal is efficiently advanced toward the observer, and thereby, also production of stray lights can be reduced.

The light that has entered the surface with the light divergence function travels while diverging. The light that has entered the surface with the light convergence function is once converged, and then, travels while diverging. Since at least one of the first surface and the second surface has one of the light divergence function and the light convergence function, the light according to the image signal can be advanced toward the light exiting surface while being diverged. Since the light according to the image signal is diverged so as to be nearly uniform on the light exiting surface, brightness variations of light from the angle conversion part can be reduced. Thereby, the screen by which the incident light can be advanced in a predetermined light exiting direction and brightness variations can be reduced is obtained.

Further, according to a preferred aspect of the invention, it is desirable that the surface having one of the light divergence function and the light convergence function of the first surface and the second surface is a curved surface represented by a curved line in a section nearly orthogonal to longitudinal sides of the first surface and the second surface. Thereby, a configuration in which at least one of the first surface and the second surface has one of the light divergence function and the light convergence function can be adopted.

Further, according to a preferred aspect of the invention, it is desirable that the first surface is a flat surface represented by a straight line in the section and the second surface is a curved surface represented by a curved line in the section. Since the first surface is a flat surface, the first surface can be made into a surface nearly perpendicular to the traveling direction of light from the projection lens. The larger the number of lights nearly perpendicularly enters the first surface, the more efficiently the lights from the projection lens can be taken into the angle conversing part. Further, the reflection of light according to the image signal on the first surface can be reduced. Thereby, the light according to the image signal can be taken into the angle conversion part efficiently.

Further, as a preferred aspect of the invention, it is desirable that the curved surface has a concave surface. Since at least one of the first surface and the second surface is a concave surface, the configuration in which at least one of the first surface and the second surface has the light divergence function can be adopted.

Further, as a preferred aspect of the invention, it is desirable that the curved surface has a convex surface. Since at least one of the first surface and the second surface is a convex surface, the configuration in which at least one of the first surface and the second surface has the light convergence function can be adopted.

Further, as a preferred aspect of the invention, it is desirable that the first surface and the second surface are provided nearly in a concentric fashion, and the curved surface has a curvature set according to a distance from a center of the concentric circles along which the first surface and the second surface are provided. For example, in the case where the light according to the image signal is entered from the projection lens into the screen, the incident angle of the light entering the screen changes with the position where the projection lens is projected onto the screen as a center. The light from the projection lens can be angle-converted into the direction toward the observer using the angle conversion part in which the first surface and the second surface are provided nearly in a concentric fashion. When the incident angle to the screen changes, the gap with respect to each angle-converted light also changes. By setting the curvature of the curved surface according to the distance from the center of the concentric circles, the gap and superposition between angle-converted lights can be reduced regardless of the incident angles to the screen with respect to the entire screen. Thereby, brightness variations and noise can be reduced with respect to the entire screen, and high-quality images can be obtained.

Further, as a preferred aspect of the invention, it is desirable that the curved surface has a larger curvature as it separates from the center of the concentric circles. In the case where the light according to the image signal is entered from the projection lens into the screen, the incident angle of the light entering the screen becomes larger as it separates from the position where the projection lens is projected onto the screen. As the incident angle to the screen becomes larger, the gap with respect to each angle-converted light also becomes larger. By adopting a configuration in which the curvature of the surface is made larger as it separates from the center of the concentric circles, the gap and superposition between angle-converted lights can be reduced regardless of the incident angles to the screen with respect to the entire screen. Thereby, brightness variations and noise can be reduced with respect to the entire screen.

Further, as a preferred aspect of the invention, it is desirable that the surface having the light convergence function of the first surface and the second surface forms a focal point within the angle conversion part and diffuses the light on the light exiting surface. For example, in the case where a focal point is formed on the light exiting surface of the angle conversion part or outside of the angle conversion part by the surface having the light convergence function, the light is further narrowed on the light exiting surface than that reflected by the surface with the light convergence function. Accordingly, a gap is formed with respect to each angle-converted light on the light exiting surface. Especially, when the focal point is formed on the light exiting surface of the angle conversion part, the periodicity of video light due to the regular structure of the angle conversion part is intensified. In this case, when the light is transmitted through the angle conversion part and another configuration having a regular structure, for example, a lenticular lens array, moire easily occurs. Since the focal point is formed within the angle conversion part by the surface with the light convergence function and the light is diffused on the light exiting surface, the gap with respect to each angle-converted light on the light exiting surface can be made smaller. Thereby, brightness variations and noise can be reduced. Further, the condition in which the moire easily occurs can be avoided.

Further, as a preferred aspect of the invention, it is desirable that the first surface and the second surface form a prism body and are arranged so that areas on the light exiting surface that the lights from the prism bodies adjacent to each other enter may be continuous in parallel with each other. The condition that the areas are continuous refers to a condition in which no gap is recognized between the areas, and the condition that the areas are in parallel refers to a condition in which no superposition is recognized between the areas. The areas on the light exiting surface that the lights from the prism bodies adjacent to each other enter are made continuous with no gap in parallel with no superposition, and thereby, the light according to the image signal can be made uniform on the light exiting surface. By arranging the first surface and the second surface so that the areas on the light exiting surface that the lights from the prism bodies adjacent to each other enter are made continuous in parallel with each other, brightness variations and noise can be reduced.

Further, as a preferred aspect of the invention, it is desired that the surface having one of the light divergence function and the light convergence function of the first surface and the second surface is provided in an area that lights traveling at angles from 40 degrees to 85 degrees relative to a normal of a reference surface on which the angle conversion part is provided enter. The gap with respect to each angle-converted light especially becomes highly visible when the incident angle is 40 degrees or more. By providing the surface having either the light divergence function or the light convergence function is provided in the area that lights at incident angles from 40 degrees to 85 degrees enter, the gap with respect to each angle-converted light can be reduced. Thereby, brightness variations and noise can be reduced.

Further, as a preferred aspect of the invention, it is desired that the first surface and the second surface form a prism body and the prism body has a third surface formed along the traveling direction of the light incident to the first surface. For example, in the configuration in which the first surface and the second surface are provided with a ridge line portion in between, the case where the leading end including the ridge line portion must be formed very thinner is conceivable. It is difficult to manufacture a prism body having a thin leading end with high precision. Since the prism body has the third surface, the parts difficult to be manufactured are omitted and angle conversion of light can be performed. By providing the third surface, the prism body can be manufactured more easily compared to the case where the thin leading end is provided. Thereby, the configuration of the screen can be easily manufactured and the cost of manufacturing can be reduced. Further, the breakage of the prism body after the manufacturing of the screen can be reduced and the reliability can be improved.

Further, as a preferred aspect of the invention, it is desired that the first surface and the second surface form a prism body and a flat portion is provided between the adjacent prism bodies. For example, in the case where the prism bodies are made adjacent, the case where it is difficult to manufacture a groove formed between the prism bodies with high precision is conceivable. Since the angle conversion part includes the flat portion, the parts difficult to be manufactured are omitted and the configuration in which angle conversion of light can be performed can be adopted. By providing the flat portion, the angle conversion part can be manufactured more easily compared to the case where the groove is formed between the prism bodies. Thereby, the configuration of the screen can be easily manufactured and the cost of manufacturing can be reduced. Furthermore, since the angle conversion part with flat portions can be easily formed by shape transfer using a mold, the mass productivity of the screen can be improved by forming the angle conversion part using shape transfer.

Further, as a preferred aspect of the invention, it is desirable that the screen has a diffusion part that diffuses the light. Thereby, the light traveling toward the observer is diffused and a good viewing angle characteristic can be obtained. Further, by diffusing the light with the diffusion part, the light periodicity that may be produced due to the regular structure of the angle conversion part can be relaxed and occurrence of moire can be reduced.

Furthermore, according to the invention, an image display apparatus including: a light source unit that supplies light; a spatial light modulation device that modulates the light from the light source unit according to an image signal; and a screen that transmits the light from the spatial light modulation device, wherein the screen is the above screen can be provided. Since the apparatus has the screen, the incident light can be efficiently advanced toward the predetermined light exiting direction and brightness variations can be reduced. Thereby, the image display apparatus that can display bright images with reduced brightness variations is obtained. Further, since the configuration in which the light according to the image signal is entered from a diagonal direction relative to the screen is adopted, the image display apparatus can be made thinner.

BRIEF DESCRIPTION OF THE DRAWINGS

The invention will be described with reference to the accompanying drawings, wherein like numbers reference like elements.

FIG. 1 shows a schematic configuration of a projector according to Embodiment 1 of the invention.

FIG. 2 shows a sectional configuration of a main part of a screen.

FIG. 3 shows a planer configuration of a Fresnel lens.

FIG. 4 is a diagram for explanation of the behavior of light in a Fresnel lens.

FIG. 7 shows a sectional configuration of a main part of the Fresnel lens with the first surface and the second surface as curved surfaces.

FIG. 11 shows the configuration near the lowermost part of the area AR3.

DETAILED DESCRIPTION OF EMBODIMENTS

Figure 5:
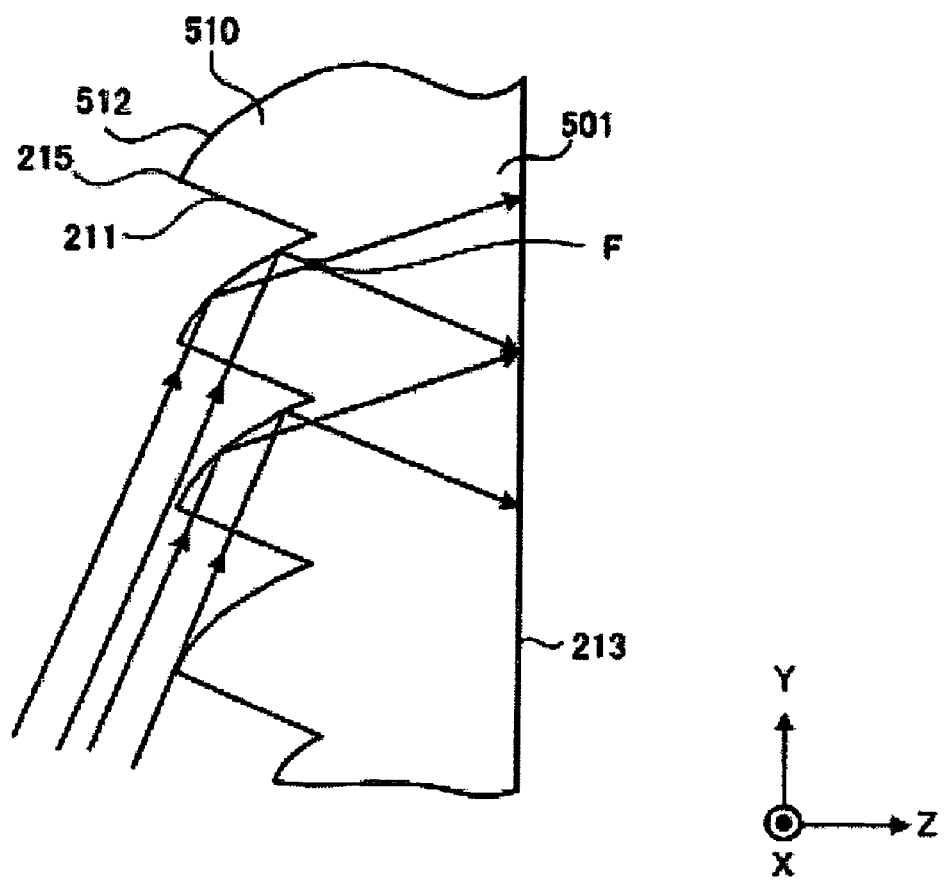
FIG. 5 shows a sectional configuration of a main part of the Fresnel lens with the second surface as a convex surface.

Hereinafter, embodiments of the invention will be described by referring to the drawings.

Embodiment 1

FIG. 1 shows a schematic configuration of a projector 100 as an image display apparatus according to Embodiment 1 of the invention. The projector 100 is a so-called rear projector by which light is projected on one side of a screen 110 and the light exiting from the other side of the screen 110 is observed for viewing an image. An ultra-high pressure mercury lamp 11 as a light source unit supplies light containing red light as a first color light (hereinafter, referred to as "R-light"), green light as a second color light (hereinafter, referred to as "G-light"), and blue light as a third color light (hereinafter, referred to as "B-light").

An integrator 12 makes the illumination distribution of light from the ultra-high pressure mercury lamp 11 nearly uniform. The light with the uniformized illumination distribution is converted into polarized light having a specific vibration direction, for example, s-polarized light by a polarization conversion element 13. The light that has been converted into s-polarized light enters an R-light transmissive dichroic mirror 14R that forms a color separation system. The R-light transmissive dichroic mirror 14R transmits the R-light and reflects G-light and B-light. The R-light that has been transmitted through the R-light transmissive dichroic mirror 14R enters a reflection mirror 15. The reflection mirror 15 bends the optical path of the R-light to 90 degrees. The R-light with the bent optical path enters a spatial light modulation device 17R. The spatial light modulation device 17R is a transmissive liquid crystal display device that modulates R-light according to an image signal. Since the direction of polarization of light does not change after the light has been transmitted through the dichroic mirror, the R-light entering the spatial light modulation device 17R remains s-polarized light.

The s-polarized light that has entered the spatial light modulation device 17R enters a liquid crystal panel (not shown). The liquid crystal panel has a liquid crystal layer for image display enclosed between two transparent substrates. The s-polarized light that has entered the liquid crystal panel is converted into p-polarized light by modulation according to an image signal. The spatial light modulation device 17R outputs R-light that has converted into p-polarized light by modulation. Thus, the R-light modulated in the spatial light modulation device 17R enters a cross dichroic prism 18 as a light combining system.

The optical paths of the G-light and B-light reflected by the R-light transmissive dichroic mirror 14R are bent to 90 degrees. The G-light and B-light with the bent optical paths enter a B-light transmissive dichroic mirror 14G. The B-light transmissive dichroic mirror 14G reflects the G-light and transmits the B-light. The G-light that has been reflected by the B-light transmissive dichroic mirror 14G enters a spatial light modulation device 17G. The spatial light modulation device 17G is a transmissive liquid crystal display device that modulates G-light according to an image signal. The s-polarized light that has entered the spatial light modulation device 17G is converted into p-polarized light by a liquid crystal panel. The spatial light modulation device 17G outputs G-light that has converted into p-polarized light by modulation. Thus, the G-light modulated in the spatial light modulation device 17G enters the cross dichroic prism 18.

The B-light that has transmitted through the B-light transmissive dichroic mirror 14G enters a spatial light modulation device 17B via two relay lenses 16 and two reflection mirrors 15. The spatial light modulation device 17B is a transmissive liquid crystal display device that modulates B-light according to an image signal. The reason that the B-light is routed through the relay lenses 16 is that the optical path of the B-light is longer than the optical paths of the R-light and G-light. The B-light that has transmitted through the B-light transmissive dichroic mirror 14G can be guided to the spatial light modulation device 17B without change using the relay lenses 16.

The s-polarized light that has entered the spatial light modulation device 17B is converted into p-polarized light by modulation of a liquid crystal panel. The spatial light modulation device 17B outputs B-light that has converted into p-polarized light by modulation. Thus, the B-light modulated in the spatial light modulation device 17B enters the cross dichroic prism 18 as the light combining system. The R-light transmissive dichroic mirror 14R and the B-light transmissive dichroic mirror 14G forming the color separation system separate the light supplied from the ultra-high pressure mercury lamp 11 into R-light, G-light, and B-light. The spatial light modulation devices 17R, 17G, and 17B may not only convert s-polarized light into p-polarized light by modulation but also convert p-polarized light into s-polarized light.

The cross dichroic prism 18 as the light combining system is formed by providing two dichroic films 18a and 18b orthogonally in an X-shape. The dichroic film 18a reflects B-light and transmits R-light and G-light. The dichroic film 18b reflects R-light and transmits B-light and G-light. Thus, the cross dichroic prism 18 combines the R-light, G-light, and B-light that have been modulated by the spatial light modulation devices 17R, 17G, and 17B, respectively.

A projection lens 20 projects the light combined by the cross dichroic prism 18 toward a reflection mirror 105. The reflection mirror 105 is provided in a position facing the screen 110 in an inner surface of a casing 107. The reflection mirror 105 reflects the projected light from the projection lens 20 toward the screen 110. The screen 110 is a transmissive screen that displays a projection image on a surface at the viewer's side by transmitting the light according to an image signal. The screen 110 is provided on a predetermined surface of the casing 107.

The screen 110 has a Fresnel lens 201, a lenticular lens array 202, and a diffusion part 203. The Fresnel lens 201 is an angle conversion part that performs angle conversion on light according to an image signal and outputs the light. The lenticular lens array 202 diffuses the light from the Fresnel lens 201 in X-direction as the horizontal direction. The diffusion part 203 further diffuses the light from the lenticular lens array 202 by a diffusion material.

The casing 107 seals the space within the casing 107. The projection lens 20 enters the light from the lower position in a diagonal direction relative to the screen 110. The projector 100 can make the casing 107 thinner by adopting a configuration that light according to an image signal is entered from a diagonal direction relative to the screen 110.

FIG. 2 shows a sectional configuration of a main part of the screen 110. The Fresnel lens 201 includes first surfaces 211 and second surfaces 212 provided at the incident side of light according to an image signal and a light exiting surface 213 that outputs the light according to the image signal. The Fresnel lens 201 has a shape in which circular sections formed by cutting out convex surfaces of convex lenses are arranged on a flat surface with the same height. The first surface 211 and the second surface 212 form a prism body 210. The prism body 210 has a nearly triangular shape in a section shown in FIG. 2. The section shown in FIG. 2 is a section that passes through near the center of the screen 110 nearly in parallel with Y-axis and nearly orthogonal to the longitudinal sides of the first surface 211 and the second surface 212.

As shown in the planer configuration in FIG. 3, the first surfaces 211 and the second surfaces 212 are provided nearly in a concentric fashion. The center of the concentric circles along which the first surfaces 211 and the second surfaces 212 are provided is a position in which the projection lens 20 is projected on an extension surface of the screen 110. The center of the concentric circles along which the first surfaces 211 and the second surfaces 212 are provided is located below the screen 110. Accordingly, the Fresnel lens 201 can angle-converts the light traveling from the position below the screen 110 in the diagonal direction toward the observer. The Fresnel lens 201 is not limited to have the configuration in which the first surfaces 211 and the second surfaces 212 are provided nearly in a concentric fashion. For example, the first surfaces 211 and the second surfaces 212 may be provided to form ellipsoidal shapes having focal points nearly in the same position.

The light incident surface of the Fresnel lens 201 is formed by alternately arranging the first surfaces 211 and the second surfaces 212 with a pitch of about 0.1 mm, for example. The pitch with which the first surfaces 211 and the second surfaces 212 are provided is set according to the incident angle of light entering the screen 110. The circular arc as part of the concentric circles along which the first surfaces 211 and the second surfaces 212 are provided are longitudinal sides of the first surfaces 211 and the second surfaces 212.

Turning back to FIG. 2, the first surface 211 is a lower surface as a side at which the projection lens 20 (see FIG. 1) is provided as seen from the screen 110. The first surface 211 is a flat surface represented by a straight line in the section that is orthogonal to the longitudinal sides of the first surface 211 and the second surface 212. Further, the second surface 212 of the Fresnel lens 201 is an upper surface. The second surface 212 is a concave surface represented by a curved line in the section that is orthogonal to the longitudinal sides of the first surface 211 and the second surface 212. The first surface 211 and the second surface 212 are joined by a ridge line portion 215.

The lenticular lens array 202 is formed by arranging lenticular lenses (not shown) in parallel. The lenticular lenses have longitudinal directions with respect to Y-direction and are arranged in parallel in X-direction. Since the lenticular lens is made to have a shape having a curvature with respect to X-direction, the lens diffuses the light from the Fresnel lens 201 with respect to X-direction. The screen 110 may use a microlens array in place of the lenticular lens array 202. The microlens array may have a configuration in which microlens elements having curvatures with respect to X-direction and Y-direction are arranged in an array form with respect to X-direction and Y-direction. In the case where the microlens array is used, the light from the Fresnel lens 201 can be diffused with respect to X-direction and Y-direction.

The diffusion part 203 includes a diffusion material of fine particles. The diffusion part 203 further diffuses the light from the Fresnel lens 201. Further, by diffusing the light with the diffusion part 203, the light periodicity that may be produced due to the regular structures of the Fresnel lens 201 and the lenticular lens array 202 can be relaxed and occurrence of moire can be reduced. By providing the diffusion part 203 separately from the Fresnel lens 201 and the lenticular lens array 202, compared to the case where a diffusion material is dispersed in the Fresnel lens 201 and the lenticular lens array 202, the reduction in resolution due to occurrence of volume scattering can be prevented.

As the diffusion part 203, a sheet-like structure with a diffusion surface on which minute convex and concave portions are formed may be used. The configuration of the screen 110 is not limited to the configuration shown in FIG. 2, but a configuration in which the diffusion part 203 is replaced by another structure, or other structures are added, for example. For example, instead of providing the diffusion part 203, a diffusion material may be dispersed in the Fresnel lens 201 and the lenticular lens array 202.

FIG. 4 is a diagram for explanation of the behavior of light in the Fresnel lens 201. The light from the projection lens 20 first enters the first surface 211 of the Fresnel lens 201. Of the lights entering the first surface 211, the light entering nearly perpendicularly relative to the first surface 211 travels remaining in the traveling direction. Further, the lights entering in directions other than the perpendicular direction to the first surface 211 is subjected to refraction on the first surface 211. Here, the first surface 211 is formed so that the light entering the screen 110 may enter at an angle nearly orthogonal to the first surface 211. The larger the number of lights that enter nearly perpendicularly relative to the first surface 211, the more efficiently the lights from the projection lens 20 can be taken into the Fresnel lens 201. Further, light reflection according to an image signal on the first surface 211 can be reduced. Thereby, the light according to the image signal can be taken into the Fresnel lens 201 efficiently.

The light from the first surface 211 is totally reflected by the second surface 212, and then, travels toward the light exiting surface 213. The second surface 212 is formed of a concave surface and has a light divergence function of diverging the incident light. Since the second surface 212 has the light divergence function, the light totally reflected by the second surface 212 travels toward the light exiting surface 213 while diverging. Further, the second surface 212 is formed in a shape such that the light from the first surface 211 diverges nearly uniformly on the light exiting surface 213. Since the light according to the image signal is diverged so as to be nearly uniform on the light exiting surface 213, brightness variations of light from the Fresnel lens 201 can be reduced.

For example, in the case where a focal point is formed on the light exiting surface 213, the periodicity of video light due to the regular structure of the Fresnel lens 201 is intensified. In this case, when the light is transmitted through the Fresnel lens 201 and another configuration having a regular structure, for example, the lenticular lens array 202, moire easily occurs. The light according to an image signal is made nearly uniform on the light exiting surface 213, and thereby, the periodicity of video light can be made weaker and the occurrence of moire can be reduced. By the way, a reflection part that reflects light may be formed in the second surface 212. In the case where the reflection part is formed in the second surface 212, the light from the first surface 211 is reflected by the reflection part, and then, travels toward the light exiting surface 213.

The light that has traveled toward the light exiting surface 213 from the second surface 212 is transmitted through the lenticular lens array 202 and the diffusion part 203 (see FIG. 2), and then, exits from the screen 110. The light from the screen 110 travels toward the observer. Further, since the light is diffused at the observer side by the Fresnel lens 201, the lenticular lens array 202, and the diffusion part 203, a good viewing angle characteristic can be obtained. Thus, the light that has diagonally entered the screen 110 can be efficiently advanced toward the observer. The light according to the image signal is efficiently advanced toward the observer, and thereby, production of stray lights can be also reduced.

Thereby, effects that the incident light is efficiently advanced in a predetermined light exiting direction and brightness variations can be reduced are exerted. Further, since the projector 100 has the screen 110, the projector can display bright images with reduced brightness variations. Furthermore, since the projector 100 has the configuration that light according to the image signal is diagonally entered into the screen 110, the projector can be made thinner.

The screen 110 is not limited to have the configuration using the Fresnel lens 201 having the second surface 212 as a concave surface. For example, the screen 110 may use a Fresnel lens 501 having a second surface 512 as a convex surface as shown in the sectional configuration of the main part of FIG. 5. The Fresnel lens 501 shown in FIG. 5 has a prism body 510 formed by the first surface 211 and the second surface 512. Since the second surface 512 is formed of a convex surface and has a light convergence function of converging the incident light. Since the second surface 512 has the light convergence function, the light totally reflected by the second surface 512 is once converged, and then, travels toward the light exiting surface 213 while diverging. Further, the second surface 512 is formed in a shape such that the light from the first surface 211 diverges nearly uniformly on the light exiting surface 213. Therefore, the incident light can be efficiently advanced in a predetermined light exiting direction and brightness variations can be reduced by using the Fresnel lens 501 for the screen 110 as is the case of using the Fresnel lens 201.

The second surface 512 having the light convergence function forms focal point F within the Fresnel lens 501 as an angle conversion part, and has a shape that diffuses the light on the light exiting surface 213. For example, in the case where a focal point is formed on the light exiting surface 213 or outside of the Fresnel lens 501 by the second surface 512, the light is further narrowed on the light exiting surface 213 than that reflected by the second surface 512. Accordingly, a gap is formed with respect to each angle-converted light on the light exiting surface 213. Especially, when the focal point is formed on the light exiting surface 213, also moire easily occurs.

Since the focal point F is formed within the Fresnel lens 201 by the second surface 512 and the light is diffused on the light exiting surface 213, the gap with respect to each angle-converted light can be made smaller. Thereby, brightness variations and noise can be reduced. Further, the condition in which the moire easily occurs can be avoided. In the case where the first surface 211 has the light divergence function, the first surface 211 can be formed so that the focal point F may be formed within the Fresnel lens 201 and the light is diverged on the light exiting surface 213.

Figure 6:
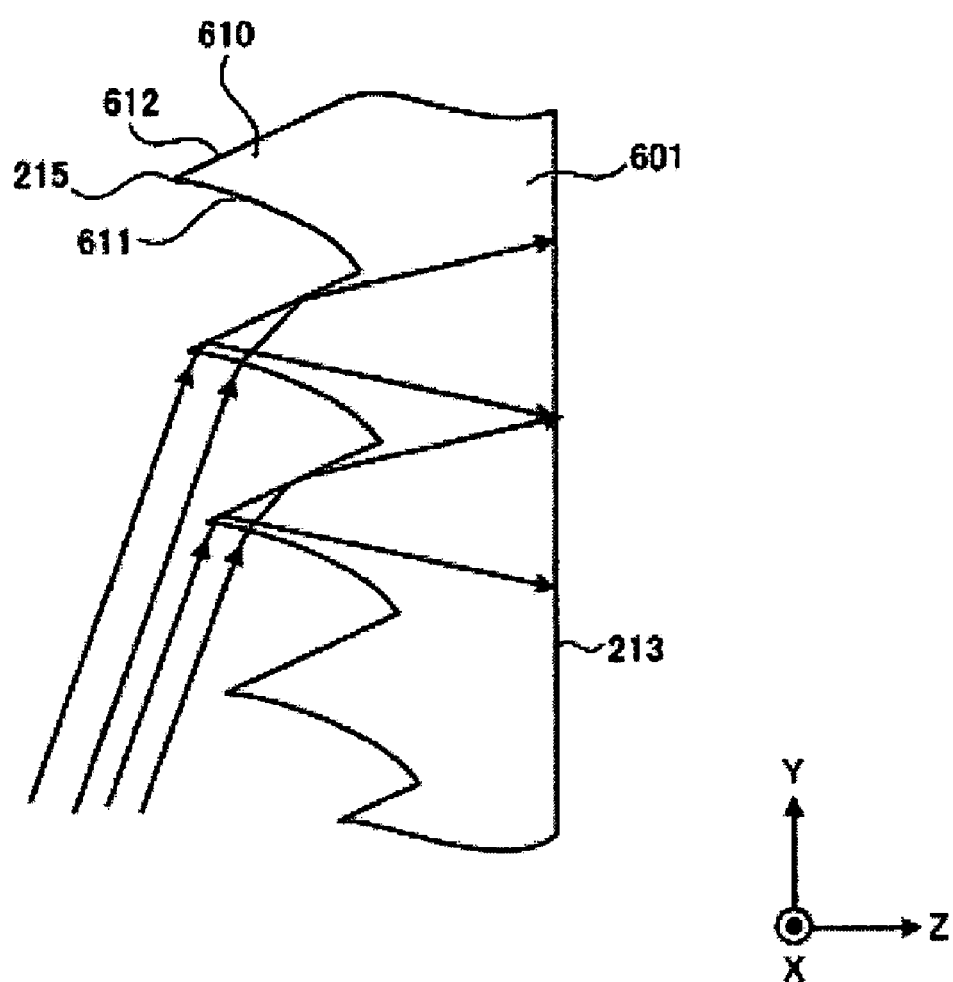
FIG. 6 shows a sectional configuration of a main part of the Fresnel lens with the first surface as a curved surface.

The screen 110 is not limited to have the configuration including the Fresnel lens with the second surface as a curved surface. The screen 110 may have a configuration including a Fresnel lens with at least one of the first surface and the second surface as a curved surface. For example, the screen 110 may use a Fresnel lens 601 with a first surface 611 as a curved surface and a second surface 612 as a flat surface as shown in the sectional configuration of the main part of FIG. 6. For example, the first surface 611 of the Fresnel lens 601 may be a concave surface having a light divergence function. The Fresnel lens 601 shown in FIG. 6 has a prism body 610 formed by the first surface 611 and the second surface 612. The light entering the first surface 611 is subjected to refraction so as to travel toward the second surface 612 while diverging. Further, the light from the first surface 611 is totally reflected on the second surface 612, and then, travels remaining diverging toward the light exiting surface 213.

Furthermore, the screen 110 may use a Fresnel lens 701 having both the first surface 611 and a second surface 712 as curved surfaces as shown in the sectional configuration of the main part of FIG. 7. For example, the first surface 611 and the second surface 712 of the Fresnel lens 701 may be concave surfaces having a light divergence function. The Fresnel lens 701 shown in FIG. 7 has a prism body 710 formed by the first surface 611 and the second surface 712. The light entering from the first surface 611 travels while diverging toward the light exiting surface 213 by the angle conversion on the first surface 611 and the second surface 712. Therefore, the incident light can be efficiently advanced in a predetermined light exiting direction and brightness variations can be reduced in the cases using the Fresnel lenses 601 and 701 as is the case of using the Fresnel lens 201.

Figure 8:
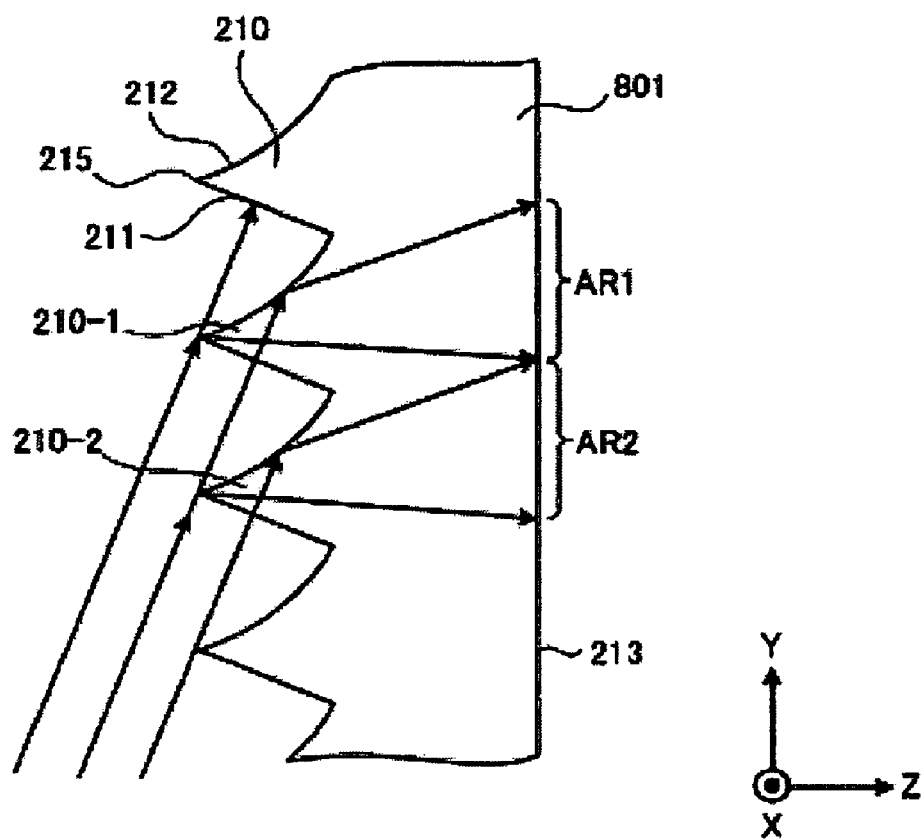
FIG. 8 is a diagram for explanation of a preferable configuration of the embodiment.

FIG. 8 is a diagram for explanation of a more preferable configuration of the respective Fresnel lenses that have been described in the embodiment. The Fresnel lens 801 shown in FIG. 8 has the same configuration of the Fresnel lens 201 that has been described using FIG. 4. Here, it is assumed that the light angle-converted by one prism body 210-1 of the Fresnel lens 801 enters area AR1 on the light exiting surface 213 and the light angle-converted by a prism body 210-2 adjacent below the prism body 210-1 enters area AR2 on the light exiting surface 213. In this case, the area AR1 and the area AR2 are continuous in parallel with each other. In the Fresnel lens 801, the first surface 211 and the second surface 212 are arranged so that the areas on the light exiting surface 213 that the lights from the prism bodies 210 adjacent to each other enter may be continuous in parallel with each other. The condition that the areas are continuous refers to a condition in which no gap is recognized between the areas, and the condition that the areas are in parallel refers to a condition in which no superposition is recognized between the areas.

The areas on the light exiting surface 213 that the lights from the prism bodies 210 adjacent to each other enter are made continuous with no gap in parallel with no superposition, and thereby, the light according to the image signal can be made uniform on the light exiting surface 213. By arranging the first surface 211 and the second surface 212 so that the areas on the light exiting surface 213 that the lights from the prism bodies 210 adjacent to each other enter are made continuous in parallel with each other, high-quality images with reduced brightness variations and noise can be obtained. When the same configuration is adopted to the Fresnel lenses other than the Fresnel lens 201 that has been described using FIG. 4, high-quality images with reduced brightness variations and noise can be obtained.

The Fresnel lens is not limited to have the configuration having at least one of the first surface and the second surface as the curved surface. At least the first surface and the second surface may be a surface having either the light divergence function or the light convergence function. For example, as the surface has either the light divergence function or the light convergence function, a surface having a polyhedral shape formed by connecting plural flat surfaces may be used. Further, the light divergence function or the light convergence function may be provided by the configuration that the surface has convex and concave portions and the configuration using light interference by diffraction, hologram, or the like.

Embodiment 2

Figure 9:
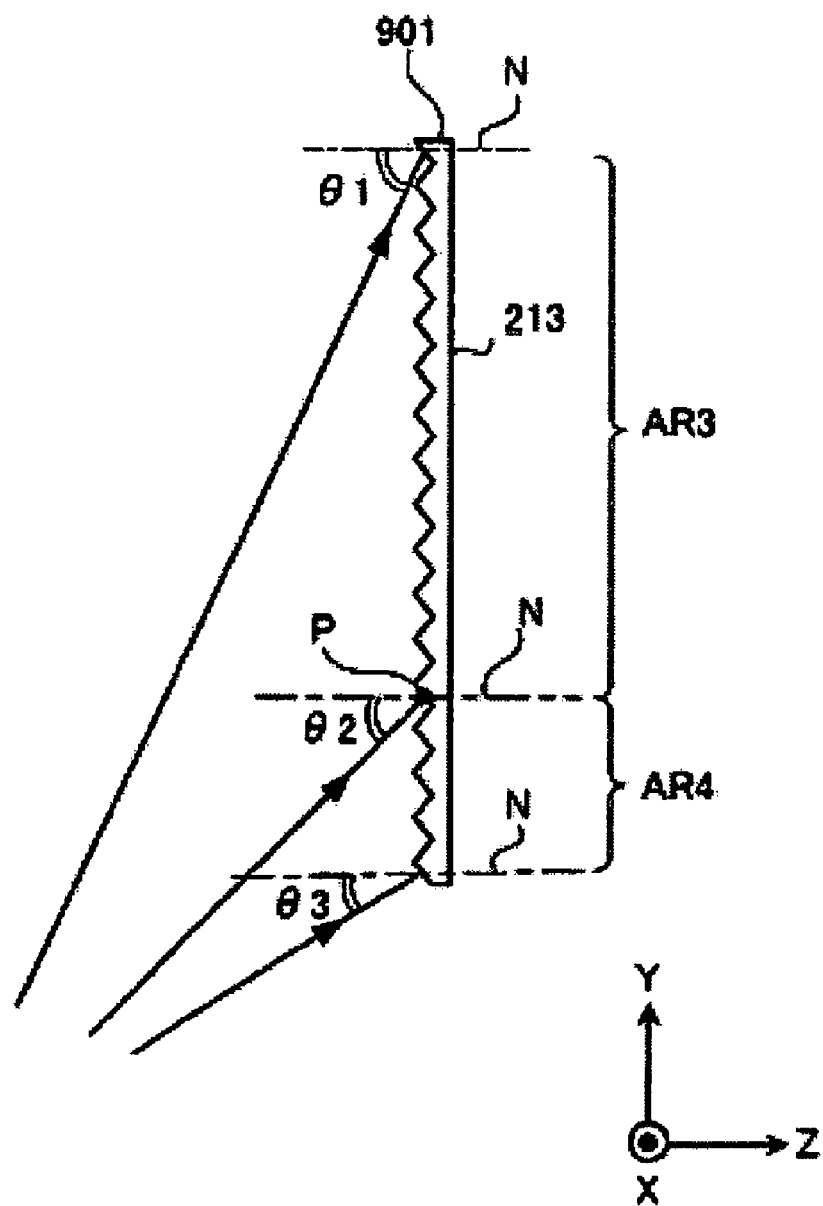
FIG. 9 is a diagram for explanation of a screen according to Embodiment 2 of the invention.

FIG. 9 shows a sectional configuration of a Fresnel lens 901 of a screen according to Embodiment 2 of the invention for explanation of an incident angle of light according to an image signal entering the screen. The screen of the embodiment can be applied to the projector 100 of Embodiment 1. Here, the incident angle is assumed as an angle formed by normal N of the light exiting surface 213 as a reference surface on which the Fresnel lens 901 is provided and incident light. Assuming that the incident angles of the light incident to the uppermost part of the screen and the light incident to the lowermost part thereof from the projection lens (not shown) are $\theta 1$ and $\theta 3$, respectively, $\theta 1 > \theta 3$ holds. The incident angle $\theta 1$ of the light incident to the uppermost part of the screen is 85 degrees, for example.

It is assumed that the incident angle $\theta 2$ of the light incident to position P between the uppermost part and the lowermost part of the Fresnel lens 901 is 40 degrees. In the sectional configuration shown in FIG. 9, lights at incident angles from 40 degrees to 85 degrees enter the part from the uppermost part to the position P. Of the first surface and the second surface of the Fresnel lens 901, a surface having either the light divergence function or the light convergence function is provided in area AR3 that lights at incident angles from 40 degrees to 85 degrees enter of the Fresnel lens 901.

The gap with respect to each angle-converted light is highly visible when the incident angle is 40 degrees or more. By providing the surface having either the light divergence function or the light convergence function in the area that lights at incident angles from 40 degrees to 85 degrees enter, the gap with respect to each angle-converted light can be reduced. Thereby, brightness variations and noise can be reduced. In the sectional configuration shown in FIG. 9, lights at incident angles less than 40 degrees enter the part from the position P to the lowermost part of the fresnel lens 901. The first surface and the second surface provided in the area AR4 that lights at incident angles less than 40 degrees enter of the Fresnel lens 901 may be surfaces provided with either the light divergence function or the light convergence function, or with no function. For example, the first surface and the second surface provided in the area AR4 may be flat surfaces.

Figure 10:
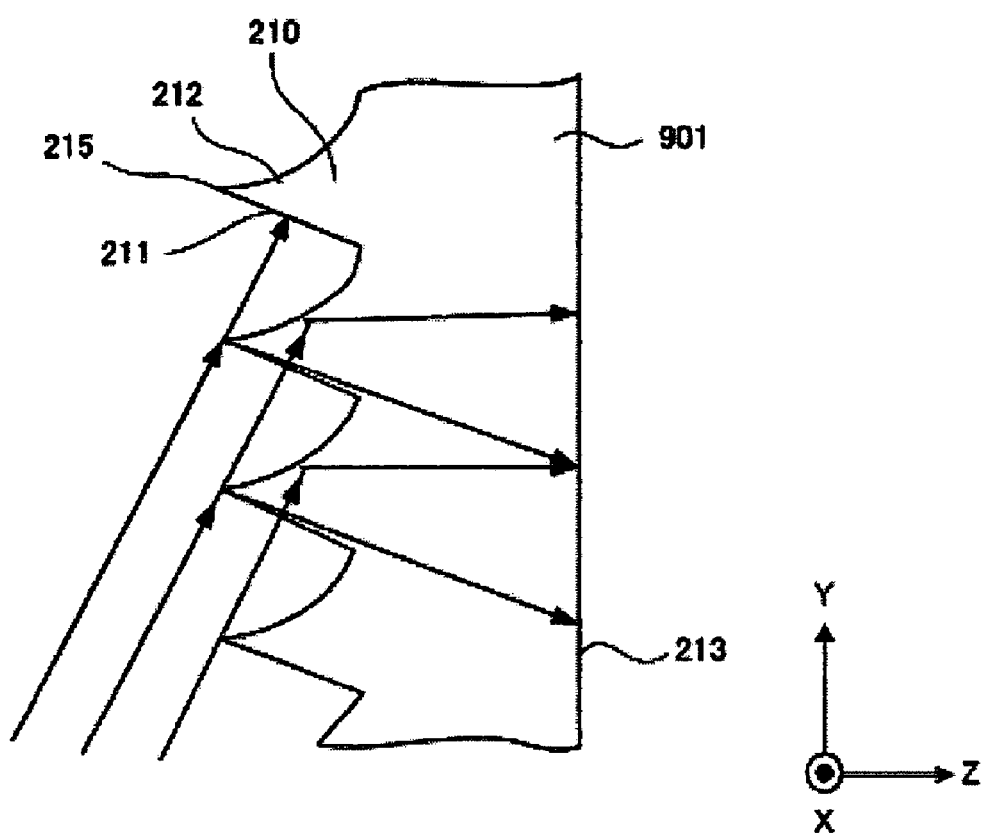
FIG. 10 shows the configuration near the uppermost part of the area AR3.

FIG. 10 shows the configuration near the uppermost part of the area AR3 of the sectional configuration of the Fresnel lens 901 shown in FIG. 9. FIG. 11 shows the configuration near the lowermost part of the area AR3 of the sectional configuration of the Fresnel lens 901 shown in FIG. 9. By comparison between the prism body 210 shown in FIG. 10 and the prism body 210 shown in FIG. 11, the curvature of the second surface 212 of the prism body 210 shown in FIG. 10 is larger than that of the prism body 210 shown in FIG. 11. The screen of the embodiment is formed so that the second surface 212 of the Fresnel lens 901 may have a larger curvature as it separates from the center of the concentric circles along which the first surfaces 211 and the second surfaces 212 are provided.

In the case where light according to an image signal is entered from the projection lens 20 (see FIG. 1) to the screen, the incident angle of the light entering the screen becomes larger as it separates from the position where the projection lens 20 is projected onto the screen. As the incident angle to the screen becomes larger, the gap with respect to each angle-converted light also becomes larger. By adopting a configuration in which the curvature of the second surface 212 is made larger as it separates from the center of the concentric circles, the gap and superposition between angle-converted lights can be reduced regardless of the incident angles to the screen with respect to the entire screen. Thereby, brightness variations and noise can be reduced with respect to the entire screen, and high-quality images can be obtained. Also in the case with the second surface as a convex surface or the first surface as a curved surface, the configuration in which the curvature is made larger as it separates from the center of the concentric circles can be adopted.

Embodiment 3

Figure 12:
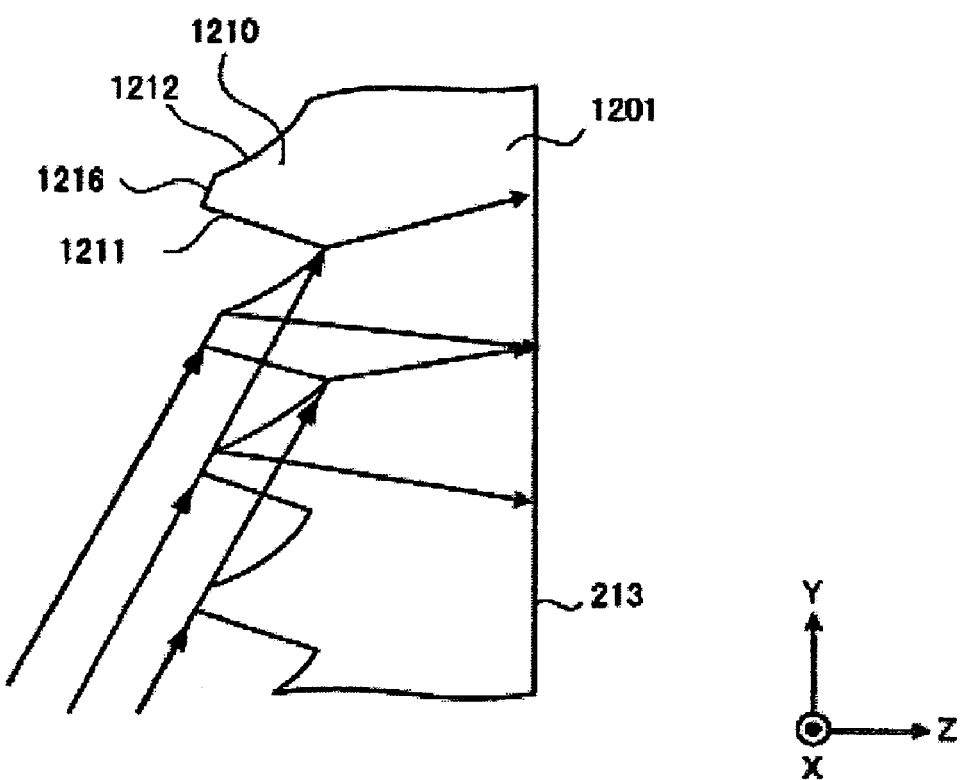
FIG. 12 is a diagram for explanation of a screen according to Embodiment 3 of the invention.

FIG. 12 shows a sectional configuration of the main part of a Fresnel lens 1201 of a screen according to Embodiment 3 of the invention. The screen of the embodiment can be applied to the projector of the Embodiment 1. The Fresnel lens 1201 is characterized by having a prism body 1210 including a third surface 1216 other than a first surface 1211 and a second surface 1212. In the prism body 1210, the third surface 1216 is provided between the first surface 1211 and the second surface 1212.

The third surface 1216 is a flat surface formed along the traveling direction of light according to an image signal incident to the screen. The prism body 1210 has a shape formed by cutting and removing a leading end of the prism body 210 including the ridge line portion 215 of the prism body 210 (see FIG. 4) of the Fresnel lens 201 of the Embodiment 1. In the case where the Fresnel lens 1201 of the embodiment is used, light can be angle-converted as is the case of the Fresnel lens 201 of the Embodiment 1.

In the configuration in which the first surface and the second surface are provided with the ridge line portion in between, the case where the leading end must be formed thinner is conceivable. It is difficult to manufacture a prism body having such a thin leading end with high precision. Especially, since the pitch of the prism bodies provided to the Fresnel lens tends to be smaller as image definition becomes higher, it becomes more difficult to manufacture a prism body having a thin leading end. In the Fresnel lens 1201 of the embodiment, the parts difficult to be manufactured are omitted and angle conversion of light can be performed using the prism body 1210 with the third surface 1216. By providing the third surface 1216, the prism body can be manufactured more easily compared to the case where the thin leading end is provided.

Thereby, effects that the configuration of the screen can be easily manufactured and the cost of manufacturing can be reduced are exerted. Further, since the configuration with the thin leading end omitted is adopted, the breakage of the prism body 1210 after the manufacturing of the screen can be reduced and the reliability can be improved. The proportion of the first surface 1211, the second surface 1212, and the third surface 1216 in the prism body 1210 is not limited to the shown one, but can be appropriately set.

Figure 13:
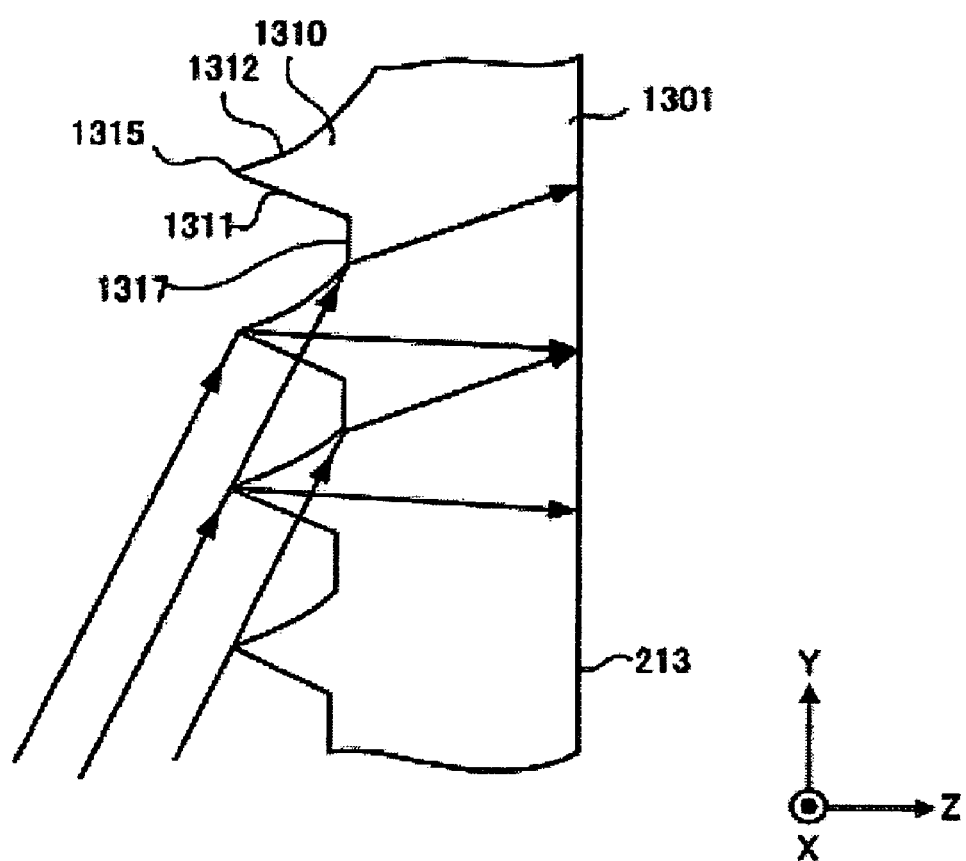
FIG. 13 is a diagram for explanation of a screen according to a modified example of Embodiment 3.

FIG. 13 shows a sectional configuration of the main part of a Fresnel lens 1301 of a screen according to a modified example of the embodiment. The Fresnel lens 1301 is characterized by having a flat portion 1317. The flat portion 1317 is provided between prism bodies 1310 adjacent to each other. The prism body 1310 has a first surface 1311 and a second surface 1312 provided with a ridge line portion 1315 in between.

The flat portion 1317 is a flat surface provided nearly in parallel with the light exiting surface 213. The Fresnel lens 1301 has a shape formed by filling the grooves between the prism bodies 210 (see FIG. 4) adjacent with each other of the Fresnel lens 201 of the Embodiment 1. In the case of using the Fresnel lens 1301 of the embodiment, angle conversion of light can be performed as is the case of using the Fresnel lens 201.

In the configuration in which prism bodies are arranged in parallel with grooves in between, the case where the grooves must be made thinner is conceivable. It is difficult to manufacture a Fresnel lens having thin grooves with high precision. In the Fresnel lens 1301 of the embodiment, the parts difficult to be manufactured are omitted and the configuration in which angle conversion of light can be performed can be adopted by providing the flat portions 1317. By providing the flat portions 1317, the Fresnel lens 1301 can be manufactured more easily compared to the case where the thin leading grooves are provided. Thereby, the configuration of the screen can be easily manufactured and the cost of manufacturing can be reduced. Furthermore, since the Fresnel lens 1301 with flat portions 1317 can be easily formed by shape transfer using a mold, the mass productivity of the screen can be improved by forming the Fresnel lens 1301 using shape transfer. The Fresnel lens may have the third surface 1216 shown in FIG. 12 and the flat portions 1317 shown in FIG. 13.

The projector 100 according to the above embodiments uses an ultra-high pressure mercury lamp as a light source unit, however, not limited to that. For example, a solid light emitting element such as a light emitting diode (LED) may be used. Further, not only a so-called 3LCD projector provided with three transmissive liquid crystal devices, but also a projector using reflective liquid crystal devices or a projector using tilt mirror devices may be used, for example.

As described above, the screen according to the invention is useful when it is used as a screen of a projector that transmits light according to an image signal, and specifically, useful when used for a thin-screen projector.

What is claimed is:

1. A screen that transmits light according to an image signal, the screen comprising:
    a first surface and a second surface, each of the first and second surfaces being provided at an incident side of the light according to the image signal;
    a light exiting surface that outputs the light according to the image signal, the second surface reflecting the light incident from the first surface toward the light exiting surface; and
    an angle conversion part that performs angle conversion on the light according to the image signal and outputting the light,
    at least one of the first surface and the second surface having one of a light divergence function of diverging the incident light and a light convergence function of converging the incident light, the surface having the light convergence function forming a focal point within the angle conversion part and diffusing the light on the light exiting surface, the at least one of the first surface and the second surface having one of the light divergence function and the light convergence function being a curved surface represented by a curved line in a section nearly orthogonal to longitudinal sides of the first surface and the second surface, the curved surface having a concave surface.

2. The screen of claim 1, the first surface being a flat surface represented by a straight line in the section and the second surface being a curved surface represented by a curved line in the section.

3. The screen of claim 1, the first surface and the second surface being defined by a section of respective concentric circles, and the curved surface having a curvature set according to a distance from a center of the concentric circles along which the first surface and the second surface are provided.

4. The screen of claim 3, the curved surface separating from center of the concentric circles and having a larger curvature as it separates from the center of the concentric circles.

5. The screen of claim 1, further comprising:
    a plurality of first surfaces and a plurality of second surfaces forming a plurality of prism bodies that emit light from a light emitting surface, the prism bodies being adjacent and being arranged so that areas on the light exiting surface of each of the prism bodies may be continuous and parallel with each other.

6. The screen of claim 1, the surface having one of the light divergence function and the light convergence function being provided in an area that lights traveling at angles from 40 degrees to 85 degrees relative to a normal of a reference surface on which the angle conversion part is provided.

7. The screen of claim 1, the first surface and the second surface forming a prism body, the prism body having a third surface formed along a travel direction of the light incident to the first surface.

8. The screen of claim 1, further comprising:
a plurality of first surfaces and a plurality of second surfaces forming a plurality of prism bodies that are adjacent to each other, a flat portion being provided between each of adjacent prism bodies.

9. The screen of claim 1, further comprising:
a diffusion part that diffuses the light.

10. An image display apparatus comprising:
the screen of claim 1;
a light source unit that supplies light; and
a spatial light modulation device that modulates the light from the light source unit according to an image signal, the screen transmitting the light from the spatial light modulation device.

11. The screen of claim 1, the angle conversion part including the first surface and the second surface.

\* \* \* \* \*